3,235,612
MANUFACTURE OF FLUOROCARBONS
Louis G. Anello, Basking Ridge, and Cyril Woolf, Morristown, N.J., assignors to Allied Chemical Corporation, New York, N.Y., a corporation of New York
No Drawing. Filed Sept. 26, 1962, Ser. No. 226,447
7 Claims. (Cl. 260—653.7)

This invention relates to processes for fluorinating aliphatic halocarbons.

A principal object of the invention lies in provision of solid catalyst, all gas phase processes for fluorinating certain aliphatic halocarbons to form higher fluorine content compounds in high yields.

In accordance with the invention, it has been found that substantially anhydrous dichromium trioxide, $Cr_2O_3$, catalyzes anhydrous HF fluorination of certain aliphatic halocarbon starting materials to form compounds having higher fluorine content than the starting material subjected to fluorination. The invention involves the discovery that dichromium trioxide possesses properties which effect high yield metathetical exchange of organically bound non-fluorine halogen of the starting material for fluorine contained in the HF fluorinating agent. The invention also includes the discovery of reaction conditions which, conjunctively with the catalysts, accomplish the stated objectives.

Reactions involved in practice of typical embodiments of the invention may be represented by $$RX + HF \rightarrow RF + HX$$
$$R'X + 2HF \rightarrow R'F_2 + 2HX$$

where X represents chlorine or bromine, and R is a halohydrocarbon radical which may contain varying amounts of flourine, chlorine and bromine.

The starting materials which may be employed in practice of the invention are saturated halogenated straight chain lower aliphatic hydrocarbon componds, preferably those containing a maximum of four carbon atoms, and containing at least one carbon atom to which is bound at least two halogen atoms at least one of which is a member of the group consisting of chlorine and bromine, all substituents of said hydrocarbon being halogens having atomic number less than 53, i.e., halogens of the group consisting of fluorine, chlorine and bromine. In the better embodiments, the starting materials are those containing one and three carbon atoms. The invention particularly provides an advantageous route for manufacture of carbon tetrafluoride, and to this end, the preferred starting materials contain a single carbon atom. In addition to the starting materials indicated in the appended examples, starting materials which may be used may include 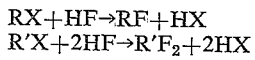.

The catalysts employed in practice of the invention are anhydrous dichromium trioxides ($Cr_2O_3$). The catalysts are those made by certain heat treatment of hydrous chromic oxides which in turn are derived as precipitates from aqueous solutions of trivalent chromium salts such as chromium nitrate, chloride, and sulfate. While precipitation of hydrous chromic oxides may be effected by means of addition to the chromic salt solutions of bases such as NaOH and KOH, the preferred catalysts are those derived from hydrous chromic oxides precipitated out of an aqueous solution of a trivalent chromium salt by means of ammonia used e.g. as ammonia gas or as $NH_4OH$. A satisfactory method for making such a hydrous oxide includes adding an aqueous solution of ammonia to a heated aqueous solution of a trivalent chromium salt, preferably the nitrate $Cr(NO_3)_3 \cdot 9H_2O$, until the aqueous solution is approximately neutral, about pH 7. The resulting solution may be boiled for a few minutes and filtered while hot to facilitate filtration. The hydrous chromic oxide precipitate recovered on filtration may be hot water-washed to leach out ammonium nitrate and any other water-soluble impurities. Hydrous $Cr_2O_3$ thus obtained may be then converted to the $Cr_2O_3$ catalysts of the invention by heat treatment at elevated temperatures not higher than about 400° C. Preliminary drying may be effected in any suitable way such as by heating under vacuum or in an inert gas stream, or by heating in any equipment provided with facilities for steam escape. In one of the better embodiments of catalyst preparation, the hydrous chromic oxide is dried at temperatures of about 100–200° C. remove the major portion of combined water, and the partially dehydrated oxide is then granulated to about 4 to 20 mesh, or pressed to pellets e.g. ⅛" diameter and ⅜" long. The sized material is then subjected to heat treatment for a substantial period of time at temperature in the range of about 300–400° C.

In all embodiments of the invention in which the catalyst employed has been made by precipitation from an aqueous solution of a trivalent chromium salt, and particularly when ammonia precipitated, it is preferred to subject the chromic oxide material to heat treatment, in a suitable vented heating chamber, i.e. in an atmosphere consisting of water vapor and possibly an inert gas, at temperature in the range of substantially 300–400° C. for at least about one hour preferably for at least two hours and for a period in the range of about two to four hours and until after the exit of the heat treater contains no water. The heat treatment noted, in addition to accomplishing an unusually thorough degree of dehydration, imparts to the catalytic material the properties to which are attributable the fluorination characteristics demonstrated herein.

Although not preferred, the dichromium trioxide catalysts may be used in supported form, i.e. supported on inert refractory material such as silica, fused alumina (Alundum) chips, or calcium or magnesium fluoride. Catalyst in supported form may be prepared by soaking fused alumina 4–8 mesh chips in a saturated solution of chromic nitrate, filtering, drying, and heat-treating at 300–400° C., as above. Alternatively, supported catalyst may be made by coprecipitating chromic hydroxide and a refractory material such as calcium or magnesium fluoride and, after filtering subjecting the same to drying and heat treatment as above. In the making of supported catalysts, which consist of $Cr_2O_3$ plus a support, proportioning of reactants may be such that the catalytic materials contain 1–60%, preferably 2–45% by weight of $Cr_2O_3$.

The catalytically active materials employed consist of the described anhydrous dichromium trioxides which may be carried by an inert support. Preferably the catalysts are used in unsupport but sized from, i.e. in granular or pelleted form. The preferred catalysts are characterized by having been formed from hydrous chromic oxides derived by amonnia precipitation from a trivalent chromium salt solution, preferably the nitrate, and subquent subjection to the 300–400° C. heat treatment described. Such catalysts are substantially amorphous, and have a crystallite size, as determined by X-ray diffraction. A further characteristic of the ammonia precipitated-heat treated unsupported $Cr_2O_3$ catalyst of the invention is relatively high surface area. Generally, the surface area is at least 5 m.²/g. and usually is greater than 50 m.²/g. The method for determining surface area was the standard nitrogen adsorption method as described by Emmett and Brunauer, Journal American Chemical Society, vol. 56, 35 (1934), and method of calculation was that of Harkins and Jura, Journal American Chemical Society, vol. 66, 1366 (1944).

Any suitable chamber or reactor tube equipped for metered introduction of reactants and constructed of inert material may be employed for carrying out the reaction provided the reaction zone is of sufficient length and cross-sectional area to accommodate the required amount of catalyst necessary to provide adequate gas contact area and at the same time afford sufficient free space for passage of the gas mixture at an economical rate of flow. Materials such as nickel, graphite, Inconel and other materials resistant to HF may be suitable for reactor tubes. Externally disposed retactor tube heating means such as electrical resistance heaters may be used for heating purposes.

The invention process in general may be carried out by contacting vapor phase starting compound with the catalyst at temperature at which fluorination takes place in the presence of gaseous HF. Operations may be suitably carried out by introducing a gaseous mixture of reactants into a reaction zone containing the catalyst and heating said mixture in the zone at indicated temperatures for a time sufficient to convert an appreciable amount of the organic halogenated starting material to higher fluorinated compound, withdrawing gaseous products from the zone, and recovering said fluorinated material from the gaseous products. Atmospheric pressure operation is preferred but the reaction may, if desired, be carried out at superatmospheric or subatmospheric pressure.

Reaction temperatures are maintained at or above the level at which fluorination of the particular starting compound begins to take plate in the presence of gaseous HF and the solid $Cr_2O_3$. Some fluorination may be noted at temperature as low as about 225° C. However, reaction proceeds at a more satisfactory rate and fluorination will generally be more complete at temperatures upwardly of about 250° C. Fluorination proceeds and formation of products may be effected to temperature as high as about 650° C., although to guard against decomposition of starting material and products, temperatures higher than about 600° C. are not particularly desirable. In the preferred embodiments, temperatures are substantially in the range of 250–600° C. Temperture variations within the general range of 250–600° C., along with variations of HF to organic starting materials mol ratios and starting material selected, regulate products and relative amounts of products formed. In those embodiments relating particularly to production of carbon tetrafluoride, temperatures in the range of 400–550 are preferred.

Molar ratio of HF to starting material (i.e. total organics charged) depends to a considerable extent on the amount of fluorine if any contained in the starting material, and the amount of fluorine desired in the sought-for product. Generally, if a higher fluorinated product is desired, and the starting material contains no fluorine or only a small proportion and contains a relatively large number of chlorine and/or bromine atoms to be substituted, correspondingly large amounts of HF are ordinarily introduced into the reactor with the starting material. One mol of HF for each atom of chlorine or bromine to be substituted is the theoretical amount. From advantageous operational viewpoint, it is generally desidable to maintain mol ratio of HF to total organic starting material sufficiently low so that a high percentage utilization of fluorine of HF will be obtained thereby simplifying the potentially difficult problem of recovering HF from the product mixture, since recycling of unreacted starting material is more practicable than recovery of unreacted HF. In view of the permissibly wide compositional variations of both starting materials and end products, HF to organic starting material mol ratios may vary correspondingly. In general, mol ratio of HF to organic starting material may lie in the range of 1:1 to 10:1.

Contact time of reactants with catalyst may range considerably. Low contact time tends toward formation of lower fluorine content products, and higher contact time toward the high fluorine compounds. Contact time may vary from one to 100 or more seconds. Contact time ordinarily is not less than about 3 seconds, and preferably in the range of 5–50 seconds. In a particular operation, the rate of flow of reactants in the reaction zone is dependent upon variables such as scale of operation, quantity of catalyst in the reactor, organic starting material used, temperature, product made, and specific apparatus employed. For a given operation, dependent upon the foregoing variables and particularly on the product desired, optimum conditions as to temperature, quantity of HF, and contact time may be best determined by test runs.

Products which may be made in accordance with the invention include those illustrated in the appended examples. Product recovery may be conventional as known in this art. Sought-for product in the gas stream exiting the reaction zone, after removal of acidic constituents and drying, may be recovered in any suitable manner as by condensation and subsequent fractional distillation. The identity and amount of product in the reactor exit gas stream may be determined by fractional distillation and/or conventional infrared or other analytical technique. The gaseous product may be condensed in a vessel maintained at a temperature substantially below the boiling point of the lowest boiling material present, e.g. by indirect cooling of the gas in a bath of e.g. acetone-Dry ice or liquid nitrogen. The particular products recovered depend, as indicated above, upon starting material and reaction conditions such as temperature, molar ratio of the reactants, etc. Substantially pure product may be recovered by distillation of condensates obtained above, and unreacted halogenated starting material and/or under fluorinated compounds recycled to subsequent operation.

The following examples illustrate the practice of the invention. In all of the examples conversion denotes mols of starting material consumed divided by mols of starting material fed multiplied by 100. Yields are on the basis of starting material consumed, i.e. mols of product divided by mols of starting material consumed, multiplied by 100.

Except as indicated, the dichromium trioxide catalysts employed in all runs were prepared by adding about 530 g. of commercial grade high purity $Cr(NO_3)_3 \cdot 9H_2O$ and 500 g. of 28% aqueous $NH_4OH$ with stirring to 2000 ml. of water heated to about 90° C. The resulting precipitated hydrous chromic oxide was filtered, water-washed, preliminarily dried by heating at about 125° C., and pelleted to about 6–10 mesh pellets. These hydrous chromic oxide pellets (about 300 cc.) were charged into a 1″ I.D. by 36″ long nickel reactor mounted in an electrically heated furnace equipped with means for maintaining in the reactor the temperatures stated. The inlet end of the reactor was provided with facilities for metered introduction of vaporous reactants, and the outlet end of the reactor was connected to the inlet end of a product recovery system. For completion of preparation of the catalyst, prior to use of the same, the pellets in the reactor were subjected to suitably vented heat treatment at temperature in the range of about 370–400° C., for about four hours, and until after the heater exit contained no water, to bring about completion of dehydration and to effectuate the property changes to which the high fluorination activity of the $Cr_2O_3$ catalyst is attributable. In all runs, unless otherwise indicated, the gaseous exit of the reactor was scrubbed with water to remove HCl and HF, and with dilute caustic to remove residual acid. Thereafter, the gas stream was dried by passing through a $CaCl_2$ tower, and depending upon the boiling points of the organics to be condensed, the dried gas stream was passed into a cold trap refrigerated by a Dry ice-acetone mixture or by liquid nitrogen bath. Analyses and product identification were effected by conventional procedures including infrared.

*Example 1.*—Subsequent to catalyst production temperature in the reactor was lowered to about 300° C. and was so maintained throughout the present run. During a period of about 3 hours, about 135 g. (0.72 mol) of $$CF_2ClCFCl_2$$

and about 30 g. (1.5 mols) of anhydrous HF were simultaneously metered into the reactor and through the catalyst bed. HF:organic mol ratio was about 2:1, and charging of reactants was such that contact time in the reactor was about 15 seconds. About 140 g. of organics were collected in the cold trap. The water scrubber liquor was titrated for HCl, and about 0.327 M Cl⁻ was obtained. The trap condensate was fractionally distilled, and $CF_2ClCF_2Cl$ was recovered in amount equivalent to about a 45% conversion and a 95% yield. After 92 hours of use, when examined by X-ray diffraction, the catalyst was found to be completely amorphous, and had a surface area of 64 m.²/g.

*Example 2.*—During a period of about 4.75 hours, about 1.41 mols of $CCl_2F_2$ and about 3.75 mols of anhydrous HF were metered into the reactor. HF:organic mol ratio was about 2.7:1, temperature was maintained at about 460° C., and contact time was about 14 seconds. About 115 g. of organic condensate were collected in a liquid nitrogen cold trap. Titration of scrubber liquor showed a recovery of 2.18 mols Cl⁻. The condensate was fractionally distilled, and there were recovered about 1.35 mols of $CF_4$, B.P. minus 128° C. and about 0.06 mol of $CF_3Cl$, B.P. 81° C., corresponding to yields of about 96% and 4% respectively.

*Example 3.*—During a period of about 6 hours, about 1.72 mols of $CCl_2F_2$, and about 7.5 mols of anhydrous HF were charged to the reactor containing the same catalyst as in Example 2. HF:organic mol ratio was about 4.4:1. Temperature throughout the run was maintained at about 470° C., and contact time was about 16 seconds. About 137 g. of condensate were recovered in the cold trap. Titration of scrubber liquor showed a recovery of 3.01 mols Cl⁻. On fractional distillation of the condensate there were obtained about 1.36 mols of $CF_4$, about 0.17 mol $CF_3Cl$, corresponding to yields of about 79% and 10%.

*Example 4.*—During a 4 hour run at temperature of about 485° C., about 1.72 mols of $CCl_4$ and about 7.1 mols of anhydrous HF were passed into the reactor containing the same catalyst as in Example 1. HF:organic mol ratio was about 4.4:1, contact time about 8 seconds, and about 155 g. of organics were recovered in the trap. Titration of water scrubber liquor showed a recovery of about 6.72 mols of Cl⁻. On fractional distillation of condensate there were recovered about 1.08 mols of $CF_4$ and about 0.6 mol of $CF_3Cl$, representing yields of about 63% and about 34%.

*Example 5.*—The reactor contained about 420 cc. of catalyst prepared as above. During a 4.75 hour run, at temperature of about 400° C., about 240 g. (2.83 mols) of $CH_2Cl_2$ and about 185 g. (9.25 mols) of anhydrous HF were charged into the reactor. HF:organic mol ratio was about 3.2:1, and contact time was about 13 seconds. About 118 g. of organics were recovered in the cold trap. Titration of water scrubber liquor showed recovery of 3.90 mols Cl⁻. On fractional distillation of the condensate, about 1.21 mols of $CH_2F_2$, B.P. minus 50° C., and about 0.07 mol of $CH_2ClF$, B.P. minus 9° C., were recovered. Conversions were about 43% and 2.5% respectively, and yields were about 54% and 3%.

*Example 6.*—During about 4 hours, about 215 g. (1.79 mols) of $CHCl_3$ and about 80 g. (4.0 mols) of anhydrous HF were charged into the reactor containing the same catalyst as in Example 5, HF:organic mol ratio being about 2.2:1. Temperature was maintained at about 320° C., and contact time was about 21 seconds. About 145 g. of organic condensate were recovered in the cold trap. Titration of water scrubber liquor showed a recovery of 2.5 mols of Cl⁻. On fractional distillation of condensate, about 0.7 mol of $CHFCl_2$, B.P. 9° C., about 0.47 mol of $CHF_2Cl$, B.P. minus 40° C., and about 0.30 mol of $CHF_3$, B.P. minus 84° C., were recovered. Respective conversions were about 39%, 27% and 17%, and yields were about 47%, 32% and 20%.

*Example 7.*—The catalyst employed in the present run was made from high purity commercial grade $Cr_2O_3$. This material was dampened with water, pressed into pellets of about 4 to 10 mesh, and charged into a 1″ I.D. by 36″ long nickel reactor, substantially the same as described above, and preliminarily dried at about 125° C. For completion of preparation of the catalyst, prior to the use of the same, the pellets in the reactor were subjected to vented heat treatment at temperature of about 375° C. for about 2 hours. Finished catalyst occupied about a 24″ bed in the reactor. Subsequent to catalyst production, temperature in the reactor was maintained at about 375° C. throughout the run. During the period of about 2.5 hours about 106 g. (0.57 mol) of vaporous $CF_2ClCFCl_2$ and about 33 g. (1.65 mols) of anhydrous HF were simultaneously metered into the reactor and through the reactor bed. HF:organic mol ratio was about 2.9:1, and contact time was about 25 seconds. About 95 g. of organics were collected in the cold trap. The water scrubber liquor was titrated for HCl, and about 0.24 mol of Cl⁻ were recovered. The trap condensate was fractionated, and $CF_2ClCF_2Cl$ was recovered in amount equivalent to about a 42% conversion and about a 95% yield. After 45 hours of run the catalyst contained 67.7% chromium and less than 0.2% fluorine. The catalyst was amorphous before and after use, and after use had a surface measurement 6 m.²/g.

*Example 8.*—The catalyst employed in this and in each of the following examples was prepared in the same manner as the catalyst used in Example 1. During a six hour run, about 670 g. (2.97 mols) of vaporous $CF_2BrCH_2Br$ and about 360 g. (18.0 mols) of anhydrous HF were charged into the reactor containing a 30″ bed of catalyst. HF:organic mol ratio was about 6:1, temperature was maintained at about 350° C., and contact time was about 8 seconds. About 337 g. of organic condensate were recovered. Titration of scrubber liquor showed a recovery of about 3.78 mols of HBr. On fractional distillation of condensate, about 1.96 mols of $CF_3CH_2Br$, B.P. 25° C., were recovered, representing a yield of about 66%.

*Example 9.*—During a five hour run, about 358 g. (2.69 mols) of vaporous $CH_3CCl_3$ and about 143 g. (7.15 mols) of anhydrous HF were charged into the reactor containing about 420 cc. of catalyst. HF:organic mol ratio was about 2.6:1. Temperature was maintained at about 287° C., and contact time was about 16 seconds. About 227 g. of organic condensate were recovered in the cold trap. Titration of scrubber liquor shows a recovery of 5.4 mols Cl⁻. On fractional distillation of the condensate, about 1.25 mols of $CH_3CF_3$, B.P. minus 47° C., about 1.22 mols of $CH_2=CCl_2$, B.P. 32° C., and about 0.07 mol of $CH_3CF_2Cl$, B.P. minus 10° C., were recovered. Yields of $CH_3CF_3$ and $CH_2=CCl_2$ were about 49.5% each.

*Example 10.*—During a five hour run about 345 g. (2.69 mols) of vaporous $CF_2ClCFClCF_2Cl$ and about 79 g. (3.95 mols) of anhydrous HF were charged. HF:organic mol ratio was about 2.7:1. Temperature was maintained at about 400° C., and contact time was about 32 seconds. About 328 g. of organic condensate were recovered in the cold trap. Titration of scrubber liquor showed a recovery of 1.72 mols Cl⁻. On fractional distillation of the condensate, about 0.765 mol of $$CF_3CFClCF_2Cl$$

B.P. 34.5° C., and about 0.347 mol of $CF_3CFClCF_3$, B.P. minus 2° C., were recovered. Conversions were about 52% and 24% respectively, and yields were about 70% and 30%.

*Example 11.*—During a 5.5 hour run, about 134 g. (0.45 mol) of vaporous $CCl_3CClFCCl_3$ and about 65 g. (3.25 mols) of anhydrous HF were charged into the reactor containing about 100 cc. of catalyst. HF:organic mol ratio was about 3:1. Temperature was maintained at about 250° C., and contact time was about 16 seconds. About 99 g. of organic condensate were recovered in the cold trap. Titration of scrubber liquor showed a recovery of 1.03 mols $Cl^-$. On fractional distillation of the condensate, about 0.29 mol of $CF_2ClCClFCCl_3$, B.P. 151° C., about 0.065 mol of $CFCl_2CClFCF_2Cl$, B.P. 112° C., and about 0.018 mol of $CF_2ClCClFCF_2Cl$, B.P. 72° C., were recovered. Yields were about 65%, 15% and 4% respectively.

*Example 12.*—During an eight hour run, about 235 g. (0.83 mol) of vaporous $CCl_3CF_2CCl_3$ and about 100 g. (5.0 mols) of anhydrous HF were charged into the reactor containing about 120 cc. of the catalyst. HF:organic mol ratio was about 6:1. Temperature was maintained at about 400° C., and contact time was about 16 seconds. About 170 g. of organic condensate were recovered. Titration of scrubber liquor showed a recovery of 2.52 mols $Cl^-$. On fractional distillation of the condensate, about 0.45 mol of $CF_2ClCF_2CF_2Cl$, B.P. 34.5° C., about 0.24 mol of $CFCl_2CF_2CF_2Cl$, B.P. 72° C., and about 0.066 mol of $CF_3CF_2CF_2Cl$, B.P. minus 2° C., were recovered. Yields were about 55%, 24% and 8% respectively.

*Example 13.*—During a six hour run, about 115 g. (0.50 mol) of vaporous $CF_2ClCF_2CF_2Cl$ and about 80 g. (4.0 mols) of anhydrous HF were charged into the reactor containing about 120 cc. of catalyst. HF:organic mol ratio was about 8:1. Temperature was maintained at about 480° C., and contact time was about 12 seconds. About 100 g. of organic condensate were recovered in the cold trap. Titration of scrubber liquor showed a recovery of 0.28 mol $Cl^-$. On fractional distillation of the condensate there was obtained a 12 g. fraction boiling between minus 31 and minus 8° C., which on analysis including infrared was shown to be mainly $C_3F_8$, B.P. minus 38° C., and $C_3F_6$, B.P. minus 29° C. There was also obtained a 12 g. fraction boiling between minus 8 and plus 2° C. identified to be $CF_3CF_2CF_2Cl$, B.P. minus 2° C.

*Example 14.*—During a six hour run, about 150 g. (0.65 mol) of vaporous $CF_2ClCF_2CFCl_2$ and about 90 g. (4.5 mols) of anhydrous HF were charged into the reactor containing about 420 cc. of catalyst. HF:organic mol ratio was about 6.9:1. Temperature was maintained at about 550° C., and contact time was about 60 seconds. About 128 g. of organic condensate were recovered in the cold trap. Titration of scrubber liquor showed a recovery of 0.81 mol of $Cl^-$. On fractional distillation of the condensate, there were obtained about 0.32 mol of $CF_2ClCF_2CF_2Cl$, B.P. 34° C., about 0.18 mol of $CF_3CF_2CF_2Cl$, B.P. minus 2° C., and about 0.072 mol of $C_3F_8$, B.P. minus 38° C. Yields corresponded to about 50%, 28% and 10% respectively.

*Example 15.*—During a 5.5 hour run, about 361 g. (3.76 mols) of vaporous $CH_3CClFCH_3$, and about 128 g. (6.4 mols) of anhydrous HF were charged into the reactor containing about 400 cc. of catalyst. HF:organic mol ratio was about 1.7:1. Temperature was maintained at 250° C., and contact time was about 16 seconds. About 298 g. of organic condensate were recovered in the cold trap. Titration of scrubber liquor showed a recovery of 2.63 mols $Cl^-$. On fractional distillation of the condensate about 2.5 mols of $CH_3CF_2CH_3$, about 0.9 mol of $CH_3CCl=CH_2$, and about 0.17 mol of $CH_3CF=CH_2$ were recovered. Conversions were about 67%, 25% and 4% respectively, and yields were about 71%, 26% and 5%.

We claim:
1. The process for effecting fluorination of a halogenated straight chain saturated lower aliphatic hydrocarbon starting material containing at least one carbon atom to which is bound at least two halogen atoms at least one of which is a member of the group consisting of chlorine and bromine, all substituents of said hydrocarbon being halogens having atomic number less than 53, which process comprises subjecting said starting material in gas phase in a reaction zone to the action of gaseous substantially anhydrous HF, while in the presence of a catalyst consisting of dichromium trioxide, at temperature substantially in the range of 225–650° C. to effect fluorination of starting material and formation of reaction products containing fluorinated aliphatic hydrocarbon compound containing more fluorine than said starting material, said catalyst having been derived from hydrous chromic oxide formed by precipitation from a trivalent chromium salt solution and subsequent subjection to heat treatment substantially in the range of 300–400° C. for not less than about one hour.

2. The process of claim 1 in which fluorination temperature is substantially in the range of 250–600° C.

3. The process for effecting fluorination of a halogenated straight chain saturated lower aliphatic hydrocarbon starting material containing not more than four carbon atoms at least one of which has bound thereto at least two halogen atoms at least one of which is a member of the group consisting of chlorine and bromine, all substituents of said hydrocarbon being halogens having atomic number less than 53, which process comprises subjecting said starting material in gas phase in a reaction zone to the action of gaseous substantially anhydrous HF and while in the presence of a catalyst consisting of dichromium trioxide, at temperature substantially in the range of 225–650° C. to effect fluorination of starting material and formation of reaction products containing fluorinated aliphatic hydrocarbon compound containing more fluorine than said starting material, said catalyst having been derived from hydrous chromic oxide formed by ammonia precipitation from a trivalent chromium salt solution and subsequent subjection to heat treatment substantially in the range of 300–400° C. for not less than about two hours.

4. The process for effecting fluorination of a halogenated straight chain saturated lower aliphatic hydrocarbon starting material containing three carbon atoms at least one of which has bound thereto at least two halogen atoms at least one of which is a member of the group consisting of chlorine and bromine, all substituents of said hydrocarbon being halogens having atomic number less than 53, which process comprises subjecting said starting material in gas phase in a reaction zone to the action of gaseous substantially anhydrous HF, while in the presence of a catalyst consisting of dichromium trioxide, at temperature substantially in the range of 225–650° C. to effect fluorination of starting material and formation of reaction products containing fluorinated aliphatic hydrocarbon compound containing more fluorine than said starting material, said catalyst having been derived from hydrous chromic oxide formed by ammonia precipitation from a trivalent chromium salt solution and subsequent subjection to heat treatment substantially in the range of 300–400° C. for not less than about two hours.

5. The process of claim 4 in which the starting material is perchlorofluorinated, and flurorination temperature is substantially in the range of 250–600° C.

6. The process for effecting fluorination of a halogenated methane starting material the carbon atom of which has bound thereto at least two halogen atoms at least one of which is a member of the group consisting of chlorine and bromine, all substituents of said methane being halogen having atomic number less than 53, which process comprises subjecting said starting material in gas phase in a reaction zone to the action of gaseous substantially anhydrous HF, while in the presence of a catalyst consisting of dichromium trioxide, at temperature substantially in the range of 250–600° C. to effect fluorination of starting material and formation of reaction products containing fluorinated aliphatic hydrocarbon compound containing more fluorine than said starting material, said catalyst having been derived from hydrous chromic oxide formed by ammonia precipitation from a trivalent chromium salt solution and subsequent subjection to heat treatment substantially in the range of 300–400° C. for not less than about two hours.

7. The process for making carbon tetrafluoride which comprises subjecting gas phase fully substituted methane starting material—containing at least one chlorine atom and having all substituents selected from the group consisting of fluorine and chlorine—in a reaction zone to the action of gaseous substantially anhydrous HF, while in the presence of a catalyst consisting of dichromium trioxide, at temperature substantially in the range of 400–550° C. to effect fluorination of starting material and formation of reaction products containing carbon tetrafluoride said catalyst having been derived from hydrous chromic oxide formed by ammonia precipitation from a trivalent chromium salt solution and subsequent subjection to heat treatment substantially in the range of 300–400° C. for not less than about two hours, and recovering carbon tetrafluoride from said reaction products.

References Cited by the Examiner

UNITED STATES PATENTS

| | | | |
|---|---|---|---|
| 2,110,369 | 3/1938 | Leicester | 260—653.7 |
| 2,436,143 | 2/1948 | Hoehn | 260—653.7 |
| 2,892,000 | 6/1959 | Skiles | 260—653.7 |
| 3,149,170 | 9/1964 | Clark et al. | 260—653 |

FOREIGN PATENTS

| | | |
|---|---|---|
| 675,318 | 12/1963 | Canada. |
| 921,254 | 3/1963 | Great Britain. |

OTHER REFERENCES

Emmett: Catalysis, vol. 1, Fundamental Principles, pages 329–331 (1954), Reinhold Publishing Company, New York, N.Y.

LEON ZITVER, *Primary Examiner.*

DANIEL D. HORWITZ, *Examiner.*